(12) United States Patent
Ananth et al.

(10) Patent No.: US 11,570,690 B2
(45) Date of Patent: Jan. 31, 2023

(54) DISTRIBUTED ACCESS AND/OR BACKHAUL FOR NON-TERRESTRIAL NODES

(71) Applicant: Aalyria Technologies, Inc., Livermore, CA (US)

(72) Inventors: Sharath Ananth, Cupertino, CA (US); Cyrus Behroozi, Menlo Park, CA (US)

(73) Assignee: Aalyria Technologies, Inc., Livermore, CA (US)

( * ) Notice: Subject to any disclaimer, the term of this patent is extended or adjusted under 35 U.S.C. 154(b) by 0 days.

(21) Appl. No.: 17/018,892

(22) Filed: Sep. 11, 2020

(65) Prior Publication Data
US 2021/0084565 A1 Mar. 18, 2021

Related U.S. Application Data

(60) Provisional application No. 62/979,527, filed on Feb. 21, 2020, provisional application No. 62/900,090, filed on Sep. 13, 2019.

(51) Int. Cl.
*H04W 40/22* (2009.01)
*H04W 40/24* (2009.01)
(Continued)

(52) U.S. Cl.
CPC ...... *H04W 40/248* (2013.01); *H04B 7/18526* (2013.01); *H04L 45/02* (2013.01);
(Continued)

(58) Field of Classification Search
CPC .............................. H04W 28/08; H04B 7/185
See application file for complete search history.

(56) References Cited

U.S. PATENT DOCUMENTS

| 20,190,141 | 5/2019 | Novlan et al. |
| 2015/0039723 A1* | 2/2015 | Williams ............. H04L 1/0071 709/217 |

(Continued)

FOREIGN PATENT DOCUMENTS

| KR | 20170030442 A | 3/2017 |
| WO | 2019107961 A1 | 6/2019 |

OTHER PUBLICATIONS

Huawei et al., "Remaining design aspects for NTN", R1-1909321,3GPP TSG RAN WG1 Meeting #98, Prague, Czech Republic, Aug. 17, 2019 sections 2.2-3.

(Continued)

*Primary Examiner* — Sulaiman Nooristany
(74) *Attorney, Agent, or Firm* — Platinum Intellectual Property LLP

(57) ABSTRACT

A method of establishing one or more links for an integrated access and backhaul for a network, where the network includes a non-terrestrial node and a terrestrial node, includes determining a plurality of links to form between a non-terrestrial node and a number of nodes in the network and causing the plurality of links to be formed. The method also includes determining a plurality of routing paths for backhaul between the non-terrestrial node to a central server, providing instructions for backhaul between the non-terrestrial node and the central server using the plurality of routing paths, and transmitting a first set of data to backhaul via a first routing path of the plurality of routing paths and a second set of data to backhaul via a second routing path of the plurality of routing paths.

13 Claims, 9 Drawing Sheets

(51) Int. Cl.
*H04L 45/02* (2022.01)
*H04B 7/185* (2006.01)
*H04W 28/08* (2009.01)
*H04W 40/28* (2009.01)

(52) U.S. Cl.
CPC ... *H04W 28/0942* (2020.05); *H04W 28/0983* (2020.05); *H04W 40/22* (2013.01); *H04W 40/28* (2013.01)

(56) References Cited

U.S. PATENT DOCUMENTS

| | | | |
|---|---|---|---|
| 2018/0227043 A1* | 8/2018 | Dankberg | H04B 7/2046 |
| 2019/0045348 A1* | 2/2019 | Li | H04W 16/28 |
| 2019/0268064 A1 | 8/2019 | Chandra et al. | |

OTHER PUBLICATIONS

PCT Search Report and Written Opinion in International Application No. PCT/US2020/050230, dated Dec. 20, 2020, 8 pages.

* cited by examiner

200

DISTRIBUTED ACCESS AND/OR BACKHAUL FOR NON-TERRESTRIAL NODES

CROSS REFERENCE TO RELATED APPLICATIONS

The present application is related to U.S. Patent Application No. 62/900,090, filed Sep. 13, 2019, the entire disclosure of which is incorporated by reference herein.

BACKGROUND

Information can be transmitted over directional point-to-point networks or point-to-multipoint networks, such as aerospace and other mobile networks. In such networks, links can be formed between pairs of nodes by aiming transceivers of each node pair towards each other. Links can also be formed by steering the transceivers of a network node either toward a discrete user terminal or node or toward some discrete point to cover a general geographic area. In some implementations, nodes may include non-geostationary satellite orbit (NGSO) satellites or other high-altitude platforms (HAPs) that are in motion relative to the Earth.

BRIEF SUMMARY

The technology described herein provides for methods, systems, or mediums for implementing 5G NR using non-terrestrial nodes, such as high-altitude platforms. The methods, systems, or mediums allow for 5G-enabled nodes to coexist with other nodes providing other types of coverage. In addition, the methods and systems allow for networks to utilize resources made available through 5G NR, as well as other types of coverage.

Aspects of the disclosure provide for a method of establishing one or more links for an integrated access and backhaul for a network. The network includes a non-terrestrial node and a terrestrial node. The method includes determining, by one or more processors of the non-terrestrial node, a plurality of links to form with a number of nodes in the network; causing, by the one or more processors, the plurality of links to be formed with the number of nodes in the network; determining, by the one or more processors, a plurality of routing paths for backhaul between the non-terrestrial node to a central server; providing, by the one or more processors, instructions for backhaul between the non-terrestrial node and the central server using the plurality of routing paths; and transmitting, by the one or more processors, a first set of data to backhaul via a first routing path of the plurality of routing paths and a second set of data to backhaul via a second routing path of the plurality of routing paths.

In one example, the determining of the plurality of links includes detecting a plurality of nodes in range of the non-terrestrial node; and wherein the number of nodes in the network is two or more of the detected plurality of nodes. In another example, the determining of the plurality of links includes receiving an indication of an estimated or actual amount of data for transmission through the network via the non-terrestrial node; and wherein the plurality of links has a combined bandwidth greater than the estimated or actual amount of data.

In a further example, the determining of the plurality of routing paths for backhaul is based on a topology of the network given a current position of the non-terrestrial node of the network. In yet another example, the determining of the plurality of routing paths for backhaul includes estimating a capacity of each routing path of the plurality of routing paths. In a still further example, the method also includes determining, by the one or more processors, the first set of data to be an amount of data within a capacity of the first routing path and the second set of data to be an amount of data within a capacity of the second routing path.

Other aspects of the disclosure provide for a system that includes one or more transceivers of a non-terrestrial node configured to establish one or more links with a remote node for an integrated access and backhaul; and one or more processors. The one or more processors are configured to determine a plurality of links to form with a number of nodes in a network; cause the one or more transceivers to form the plurality of links with the number of nodes in the network; determine a plurality of routing paths for backhaul between the non-terrestrial node to a central server; provide instructions for backhaul between the non-terrestrial node and the central server using the plurality of routing paths; and transmit, using the one or more transceivers, a first set of data to backhaul via a first routing path of the plurality of routing paths and a second set of data to backhaul via a second routing path of the plurality of routing paths.

In one example, the determining of the plurality of links is based on a plurality of nodes in range of the non-terrestrial node; and wherein the number of nodes in the network is two or more of the plurality of nodes. In another example, the determining of the plurality of links is based on a received indication of an estimated or actual amount of data for transmission through the network via the non-terrestrial node; and wherein the plurality of links has a combined bandwidth greater than the estimated or actual amount of data.

In a further example, the determining of the plurality of routing paths for backhaul is based on a topology of the network given a current position of the non-terrestrial node of the network. In yet another example, the determining of the plurality of routing paths for backhaul is based on an estimated capacity of each routing path of the plurality of routing paths. IN a still further example, the one or more processors are also configured to determine the first set of data to be an amount of data within a capacity of the first routing path and the second set of data to be an amount of data within a capacity of the second routing path. In another example, the system also includes the non-terrestrial node.

Further aspects of the disclosure provide for a method of configuring a network to provide integrated access and backhaul. The network includes a non-terrestrial node and a terrestrial node. The method includes receiving, by one or more processors of a network controller, status information from nodes of the network, the status information including a location of the non-terrestrial node; determining, by the one or more processors, available nodes and possible links in the network at a given point in time based on the received status information, the possible links including a first access or backhaul link between the non-terrestrial node and a first available node of the network and a second access or backhaul link between the non-terrestrial node and a second available node of the network; receiving, by the one or more processors, demand information related to data to be transmitted through the network or related to bandwidth requirements for servicing user equipment in a given geographic area at the given point in time; determining, by the one or more processors, an overall network configuration that includes the first access or backhaul link and the second access or backhaul link based on the received demand information; and sending, by the one or more processors, instructions to the nodes of the network for implementing the overall network configuration and operating the first access or backhaul link and the second access or backhaul link at the given point in time.

In one example, the status information includes a coverage area for a given node and bandwidth provided to the coverage area by the given node; and wherein the determining of the overall network configuration is further based on the coverage area and the bandwidth for the given node. In another example, the status information includes a condition of a given node and weather at the given node; and wherein the determining of the available nodes and the possible links in the network at the given point in time includes determining a topology of the network at the given point in time based on the condition of the given node and the weather at the given node. In a further example, the given point in time is a future point in time.

In yet another example, the demand information includes an amount of data, a source location, a destination location, and a requested time of transmission. In a still further example, the determining of the overall network configuration includes determining one or more flows for the given point in time using a topology of the network for the given point in time and the demand information; and selecting, for the overall network configuration, one or more links from the possible links between available nodes based on the one or more flows. In another example, the instructions include one or more protocols for 5G NR communications.

DETAILED DESCRIPTION

Overview

Figure 1:
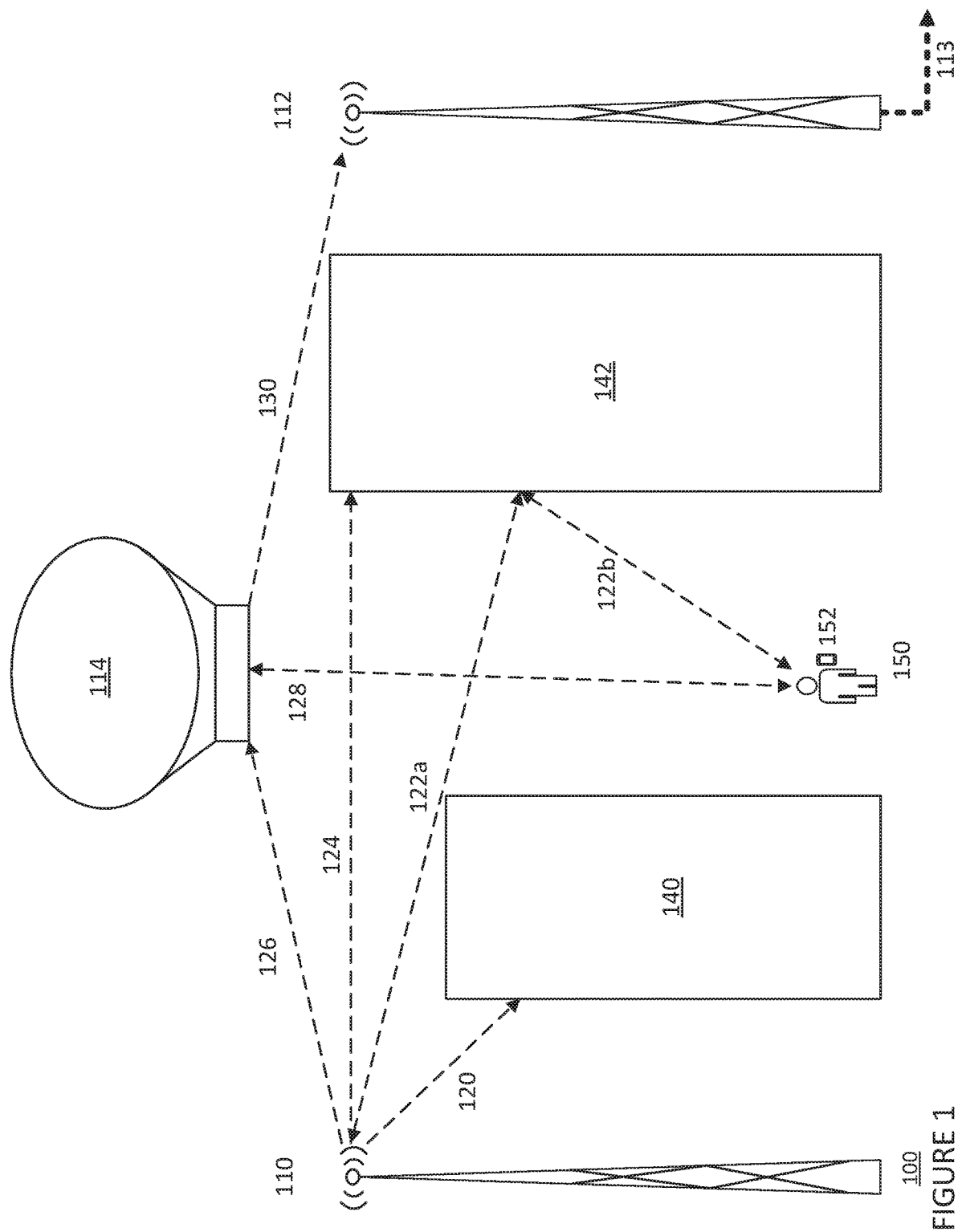
FIG. 1 is a pictorial diagram of a portion of an example network in accordance with aspects of the disclosure.

The technology relates to implementing 5G NR using non-terrestrial nodes, such as high-altitude platforms. In particular, the 5G-enabled non-terrestrial nodes may be required to coexist with other nodes providing other types of coverage, such as 4G LTE. In areas where there is 5G coverage as well as another type of network coverage is available, there is a need to coordinate between the different types of signals to provide coverage to user equipment (UE), or client devices, in these areas. There are also new opportunities made available by the presence of multiple types of signals that may be taken advantage of in order to increase coverage or capacity of the overall network. For example, the backhaul capacity may be increased for non-terrestrial nodes by implementing distributed backhaul from a non-terrestrial node to a plurality of donor nodes of the network.

A non-terrestrial node, such as balloons that are able to be positioned above obstacles and in the line-of-sight of access nodes, may offer a means for avoiding obstacles to more successfully provide access links, backhaul links, or implement integrated access and backhaul (IAB) services. In particular, a given non-terrestrial node may communicate with a given terrestrial network node to provide access to users in a geographic area or backhaul to a network. The given terrestrial network node may include one or more antennas that are capable of pointing above the horizon. The given terrestrial network node may use the one or more antennas to scan the horizon when the given non-terrestrial node is within a vicinity of the given terrestrial network node. When a connection with the given non-terrestrial node is obtained, the given terrestrial network may establish an access link and/or a backhaul link with the given non-terrestrial node.

In particular, the IAB component that is available in 5G NR may be implemented in a distributed manner using non-terrestrial nodes of the network. For IAB, the same spectrum may be used for both access links and backhaul links. Rather than have access and backhaul of a node passed via a single channel to one other node, backhaul may be distributed through multiple channels with multiple nodes. Distributing the access or backhaul may allow for greater capacity and reliability for access links or backhauling in the network.

The features disclosed herein may allow for a more seamless integration of 5G-enabled non-terrestrial nodes with existing terrestrial nodes that provide another type of coverage, such as 4G LTE. The 5G-enabled non-terrestrial nodes may then be used to supplement, expand, or strengthen the coverage of existing networks. For example, the service reliability of a network may be reinforced for M2M or IoT devices or for passengers onboard moving platforms. Multicast and broadcast resources for data may also be provided using the 5G-enabled non-terrestrial nodes, especially towards the network edges or at user terminals. In addition, non-terrestrial nodes, such as high-altitude balloons, may be used to expand network coverage into areas having little to no infrastructure for terrestrial networks. The use of non-terrestrial nodes may reduce the time and cost required to plan and install additional terrestrial nodes, especially in more remote areas.

Example Systems and Network

FIG. 1 is a pictorial diagram of an example system 100 of network nodes in a network. In particular, FIG. 1 shows a portion of an access layer of the network. The network may include nodes mounted on various land- and air-based devices, some of which may change position with respect to other nodes in the network over time. For example, as shown in FIG. 1, the network includes, as nodes, a first terrestrial tower 110 and a second terrestrial tower 112. The network also includes as a node a high-altitude platform 114. As shown, HAP 114 is a balloon. In other embodiments, the HAP may be a blimp, an airplane, an unmanned aerial vehicle (UAV) such as a drone, a satellite, or another platform capable of low Earth orbit.

Nodes in the network may be equipped to transmit and receive mmWave signals or other very high frequency signals. Additionally or alternatively, nodes in the network may be equipped to transmit and receive other radio-frequency signals, optical signals, or other communication signal capable of travelling through free space. Arrows shown projecting from nodes represent possible paths 120, 122a, 122b, 124, 126, 128, 130 for a transmitted communication signal. As shown in FIG. 1, some possible paths may be blocked by buildings, such as buildings 140, 142. For example, a signal following path 120 from node 110 may be angled below the horizon and be blocked by building 140. A signal following path 122a from node 110 may be angled above path 120, avoiding building 140, but then may contact building 142. The signal following path 122a may reflect off building 142 and follow path 122b towards the ground location of a user 150, carrying a client device 152. A signal following path 124 from node 110 may be angled towards or above the horizon, nearly parallel to the ground, passing over building 140, but then may be blocked by building 142. A signal following path 126 from node 110 may be angled above the horizon and reach node 114. A signal following path 128 from node 114 directed to the ground location of user 150. A signal following path 130 from node 114 may be angled below the horizon, pass over building 142, and reach node 112.

Also shown in FIG. 1, a signal may be transmitted from the client device 152 of the user 150 back towards one or more nodes of the network. For example, a signal from the client device 152 may be transmitted back along paths 122b and 122a towards node 110. Another signal from the client device 152 may be transmitted back along path 128 towards node 114. In addition, multiple users or multiple client devices may form bi-directional access links with a given node of the network at a given point in time, in addition to the user 150 and the client device 152 shown in FIG. 1.

The network nodes as shown in FIG. 1 is illustrative only, and the network may include additional or different nodes. For example, in some implementations, the network may include additional HAPs and/or additional terrestrial towers. When the network includes at least one low Earth orbit or high Earth orbit satellite as well as one other type of HAP, the network may be defined as a hybrid HAP/satellite network.

Figure 2:
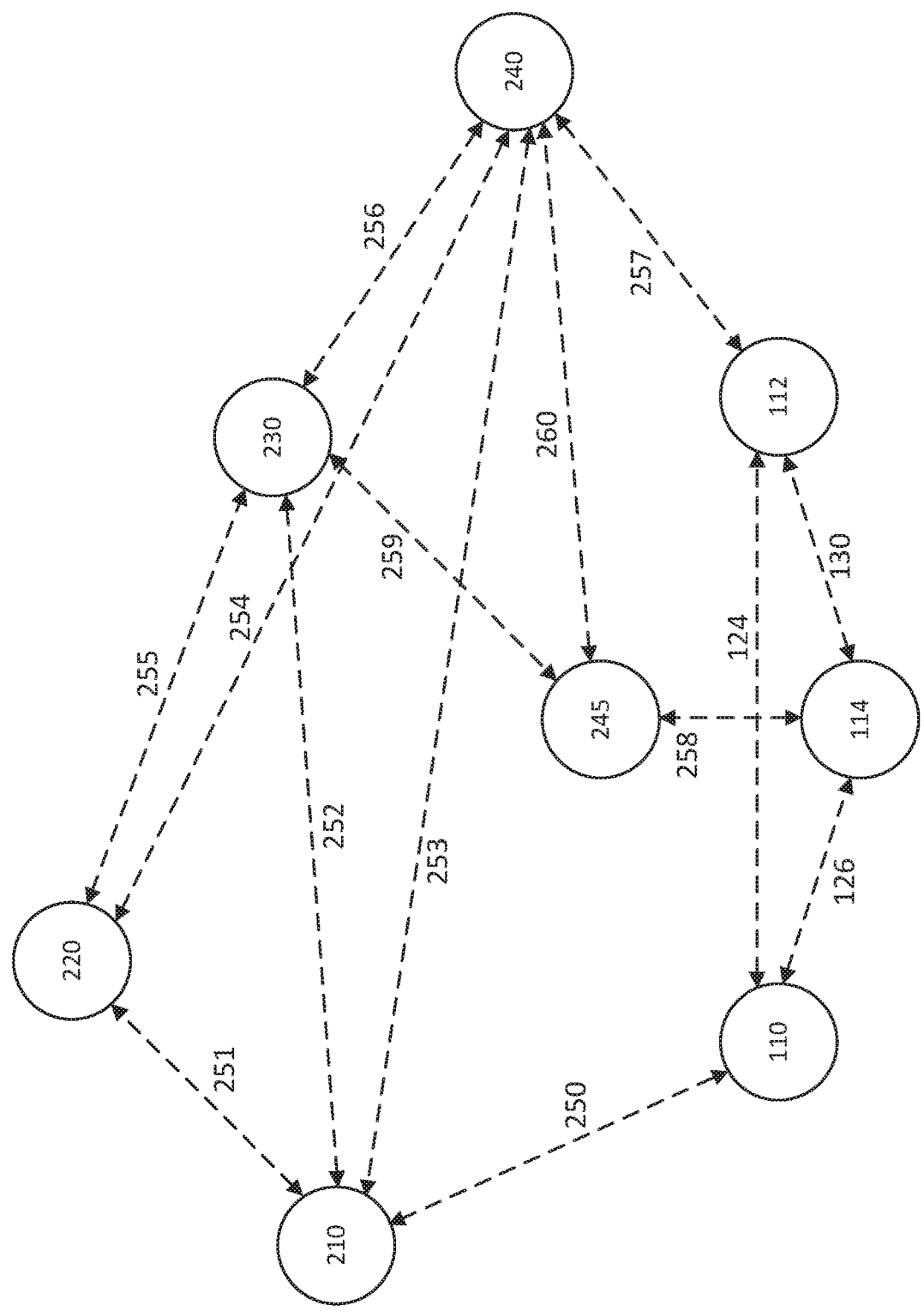
FIG. 2 is a diagram of an example network in accordance with aspects of the disclosure.

For example, as shown in FIG. 2, the network 200 that includes the system 100 may also include as nodes additional terrestrial towers 210, 220, 230, 240, and 245. Arrows shown between a pair of nodes represent possible communication paths between the nodes. In addition to paths 124, 126, and 130 corresponding to the paths shown in FIG. 1, paths 250-260 are shown between the nodes. The network 200 as shown in FIG. 2 is illustrative only, and in some implementations the network 200 may include additional or different nodes. The status information received from the nodes of the network may include the location information of HAP 114 or weather conditions at locations of terrestrial towers 110, 112, 210, 220, 230, 240, and 245 at a current time or a future time. The location information of HAP 114 may include a projected trajectory or set location, such as a future location at the future time that is in signal range of the terrestrial towers 110, 112.

In some implementations, the network may serve as an access network for client devices such as cellular phones, laptop computers, desktop computers, wearable devices, or tablet computers. For example, nodes 110, 112, 114 may connect to the datacenters via wireless, fiber, or cable backbone network links or transit networks operated by third parties. The nodes 110, 112, 114 may provide wireless access for the users, and may forward user requests to the datacenters and return responses to the users via the backbone network links.

In particular, the first terrestrial tower 110, the second terrestrial tower 112, and the HAP 114 may include wireless transceivers configured to operate in a cellular or other mobile network, such as 5G NR (new radio) networks or LTE networks. The nodes 110, 112, 114 may operate as gNodeB stations, eNodeB stations, or other wireless access points, such as WiMAX or UMTS access points. One or more terrestrial towers in the network may include an optical fiber or other link connecting the one or more terrestrial towers to another terrestrial tower or datacenter. For example, the second terrestrial tower 112 may include fiber 113, shown by a dotted arrow, that connects to another terrestrial tower (not shown). As shown in FIG. 1, user 150 carrying a client device 152 may be configured to communicate with one or more of the nodes in the network. The network also may be connected to a larger network, such as the Internet, and may be configured to provide a client device with access to resources stored on or provided through the larger computer network.

Figure 3:
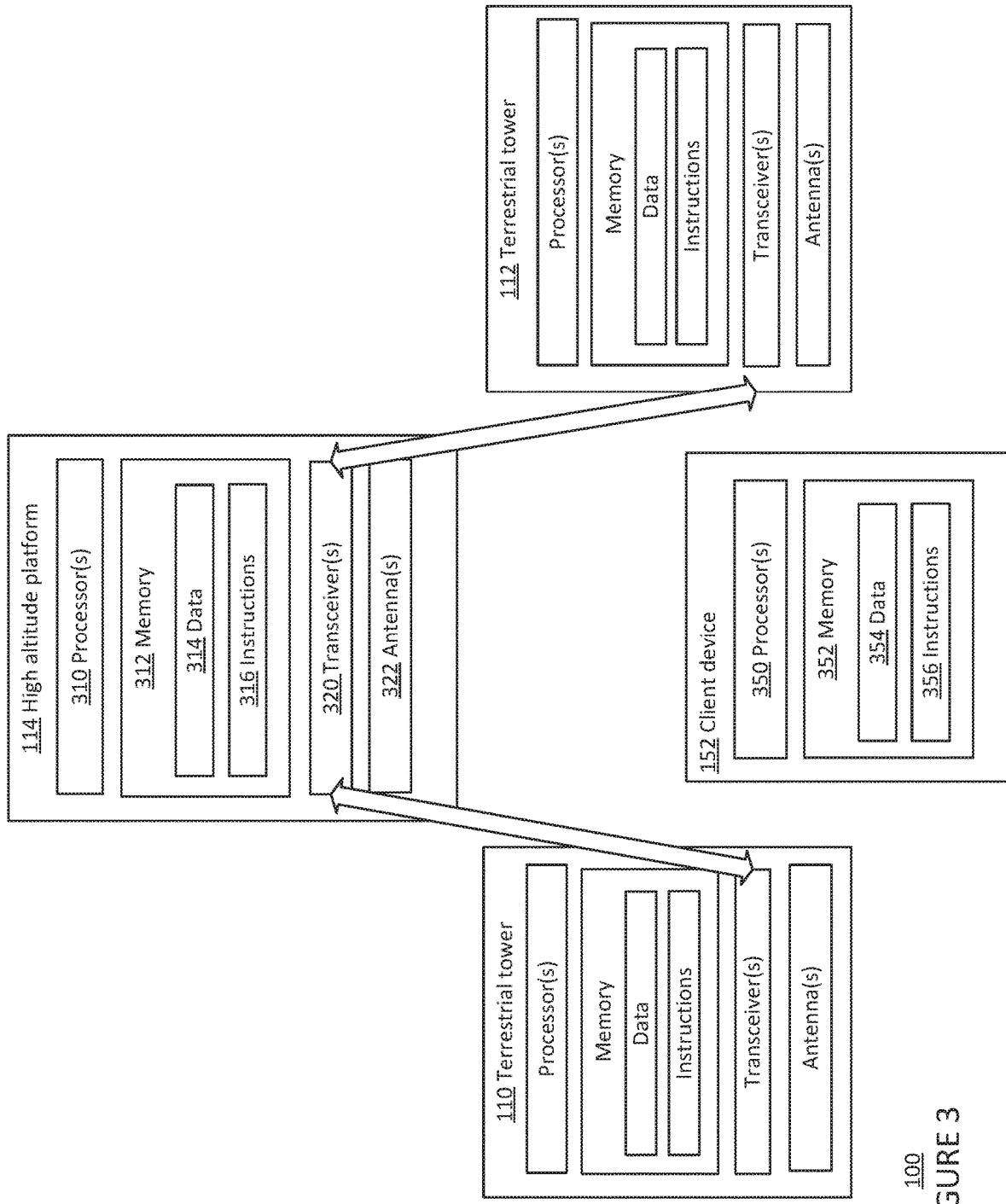
FIG. 3 is a functional diagram of the portion of the network shown in FIG. 1 in accordance with aspects of the disclosure.

As shown in FIG. 3, each node, such as first terrestrial tower 110, second terrestrial tower 112, and HAP 114, may include one or more transceivers configured to transmit and receive communication signals and create one or more communication links with another node in the network. Referring to HAP 114 as an example, each of the nodes, may include one or more processors 310, memory 312, one or more transceivers 320, and one or more antenna 322. While only terrestrial towers 110, 112 and HAP 114 are shown, other terrestrial towers and HAPs in the network may have the same or as similar configurations.

The one or more processors 310 may be any conventional processors, such as commercially available CPUs. Alternatively, the one or more processors may be a dedicated device such as an application specific integrated circuit (ASIC) or other hardware-based processor, such as a field programmable gate array (FPGA). The one or more processors 310 may be configured to operate according to a given protocol architecture for a mobile network, such as 5G NR architecture or LTE radio protocol architecture. Although FIG. 3 functionally illustrates the one or more processors 310 and memory 312 as being within the same block, it will be understood that the one or more processors 310 and memory 312 may actually comprise multiple processors and memories that may or may not be stored within the same physical housing. Accordingly, references to a processor or computer will be understood to include references to a collection of processors or computers or memories that may or may not operate in parallel.

Memory 312 stores information accessible by the one or more processors 310, including data 314, and instructions 316, that may be executed by the one or more processors 310. The memory may be of any type capable of storing information accessible by the processor, including non-transitory and tangible computer-readable mediums containing computer readable instructions such as a hard-drive, memory card, ROM, RAM, DVD or other optical disks, as well as other write-capable and read-only memories. The system and method may include different combinations of the foregoing, whereby different portions of the data 314 and instructions 316 are stored on different types of media. In the memory of each node, such as memory 312 of HAP 114, a forwarding information base or forwarding table may be stored that indicate how signals received at each node should be forwarded, or transmitted. For example, the forwarding table stored in memory 312 may indicate that a signal received from ground station 110 should be forwarded to HAP 114.

Data 314 may be retrieved, stored or modified by the one or more processors 310 in accordance with the instructions 316. For instance, although the system and method are not limited by any particular data structure, the data 314 may be stored in computer registers, in a relational database as a table having a plurality of different fields and records, XML documents or flat files. The data 314 may also be formatted in any computer-readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 314 may comprise any information sufficient to identify the relevant information, such as numbers, descriptive text, proprietary codes, references to data stored in other areas of the same memory or different memories (including other network locations) or information that is used by a function to calculate the relevant data.

The instructions 316 may be any set of instructions to be executed directly (such as machine code) or indirectly (such as scripts) by the one or more processors 310. For example, the instructions 316 may include the given protocol architecture for the mobile network of which the node is a part. The given protocol architecture may include a split architecture between a central unit and a distributed unit. In addition, the given protocol architecture may define a control plane, a user plane, or other protocol layers. The given protocol architecture may also include an interface that defines a plurality of messages for use in communication between the protocol layers. The instructions 316 may be stored as computer code on the computer-readable medium. In that regard, the terms "instructions" and "programs" may be used interchangeably herein. The instructions 316 may be stored in object code format for direct processing by the one or more processors 310, or in any other computer language including scripts or collections of independent source code modules that are interpreted on demand or compiled in advance. Functions, methods and routines of the instructions 316 are explained in more detail below.

The one or more transceivers 320 may include at least one wireless transceiver mounted to actuators that can be controlled, or steered, to point in a desired direction. To form a wireless link between two nodes, such as the node associated with the HAP 114 and the node associated with the first terrestrial tower 110, the wireless transceivers of the respective nodes can be controlled to point in the direction of one another so that data can be sent and received between the nodes. For nodes with fiber or cable connections, such as second terrestrial tower 112, the one or more transceivers 320 may also include at least one transceiver configured to communicate via a fiber or cable connection.

As further shown in FIG. 3, the client device 152 associated with user 150 may be a personal computing device or a server with one or more processors 350, memory 352, data 354, and instructions 356 similar to those described above with respect to the one or more processors 310, memory 312, data 314, and instructions 316. Personal computing devices may include a personal computer that has all of the components normally used in connection with a personal computer such as a central processing unit (CPU), memory (e.g., RAM and internal hard drives) storing data and instructions, an electronic display (e.g., a monitor having a screen, a small LCD touch-screen, a projector, a television, or any other electrical device that is operable to display information), user input (e.g., a mouse, keyboard, touch-screen or microphone), camera, speakers, a network interface device, and all of the components used for connecting these elements to one another. Personal computing devices may also include mobile devices such as PDAs, cellular phones, and the like. Indeed, client device 152 may be any device capable of processing instructions and transmitting data to and from humans and other computers including general purpose computers, network computers lacking local storage capability, and set-top boxes for televisions. In some embodiments, client devices may be associated with one or more self-defined network (SDN) applications and may have one or more northbound interface (NBI) drivers.

Figure 4:
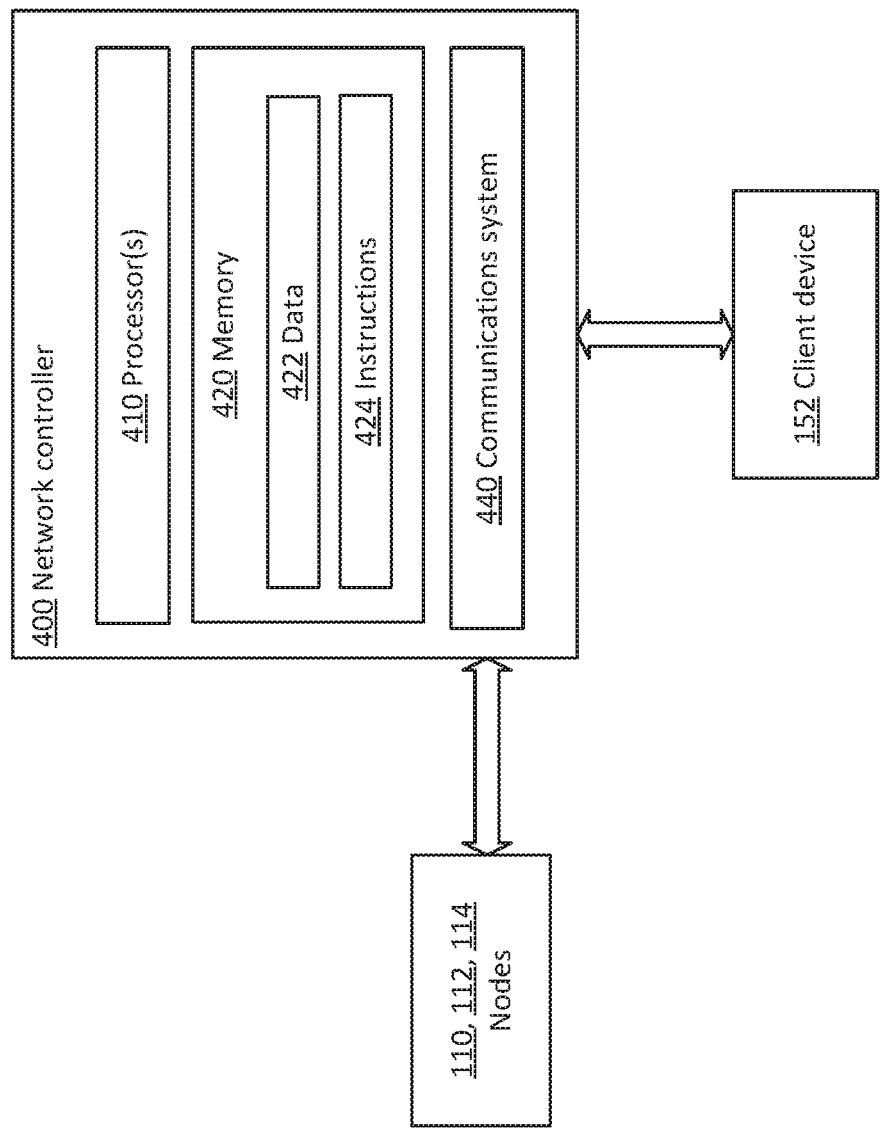
FIG. 4 is a functional diagram of a network controller in accordance with aspects of the disclosure.

In some implementations, the network can be an SDN that is controlled by an SDN controller, such as network controller 400 depicted in FIG. 4. The network controller 400 may be located at one of the network nodes or at a separate platform, such as, for example, in a datacenter. The nodes of the network, including nodes 110, 112, 114 may be configured to communicate with one another using the steerable transceivers, such as the one or more transceivers 320. As the HAPs in the network, such as HAP 114, move with respect to other nodes in the network, such as terrestrial towers 110, 112, some network links may become infeasible due to range of the transceivers or obstacles between the nodes. Thus, the configuration of the network may require regular (i.e., periodic) or irregular reconfiguration using the network controller 400 to maintain connectivity and to satisfy determined network flows.

FIG. 4 is a block diagram of network controller 400. The network controller 400 may be configured to send control messages to the nodes of the network to provide reconfiguration according to updated topology, to pass routing information, and to schedule reconfigurations to transmit client data. As shown in FIG. 4, the network controller 400 may include one or more processors 410, memory, 420, and communications system 440. The one or more processors 410 may be similar to the one or more processors 310 described above. Memory 420 may store information accessible by the one or more processors 410, including data 422 and instructions 424 that may be executed by processor 410. Memory 420, data 422, and instructions 424 may be configured similarly to memory 312, data 314, and instructions 316 described above. The data 422 may include a table representing all of the available nodes and possible links in the network 100 at a given time or time frame. The instructions 424 may include one or more modules for managing topology and routing, determining topology, determining network flows, solving for network configurations, controlling flight of a given HAP, or scheduling future network configurations.

The communications system 440 may be configured to communicate with the nodes of network, such as nodes 110, 112, 114, as well as one or more client devices, such as client device 152. In some embodiments, the communication system 440 includes a Control to Data-Plane Interface (CDPI) driver configured to communicate with a CDPI agent at each of the nodes 110, 112, 114. In addition, the communications system 440 of the network controller 400 may include one or more NBI agents configured to communicate with an NBI driver at each client device associated with one or more SDN applications. The communication system 440 may optionally or alternatively be configured to transmit and receive a signal via radio frequencies, optical frequencies, optical fiber, cable, or other communication means to and from the nodes in the network and the one or more client devices.

Example Implementations and Methods

In addition to the operations described above and illustrated in the figures, various implementations and methods will now be described. It should be understood that the described operations and steps do not have to be performed in the precise order provided below. Rather, various operations and steps can be handled in a different order or simultaneously, and operations and steps may also be added or omitted.

Figure 5:
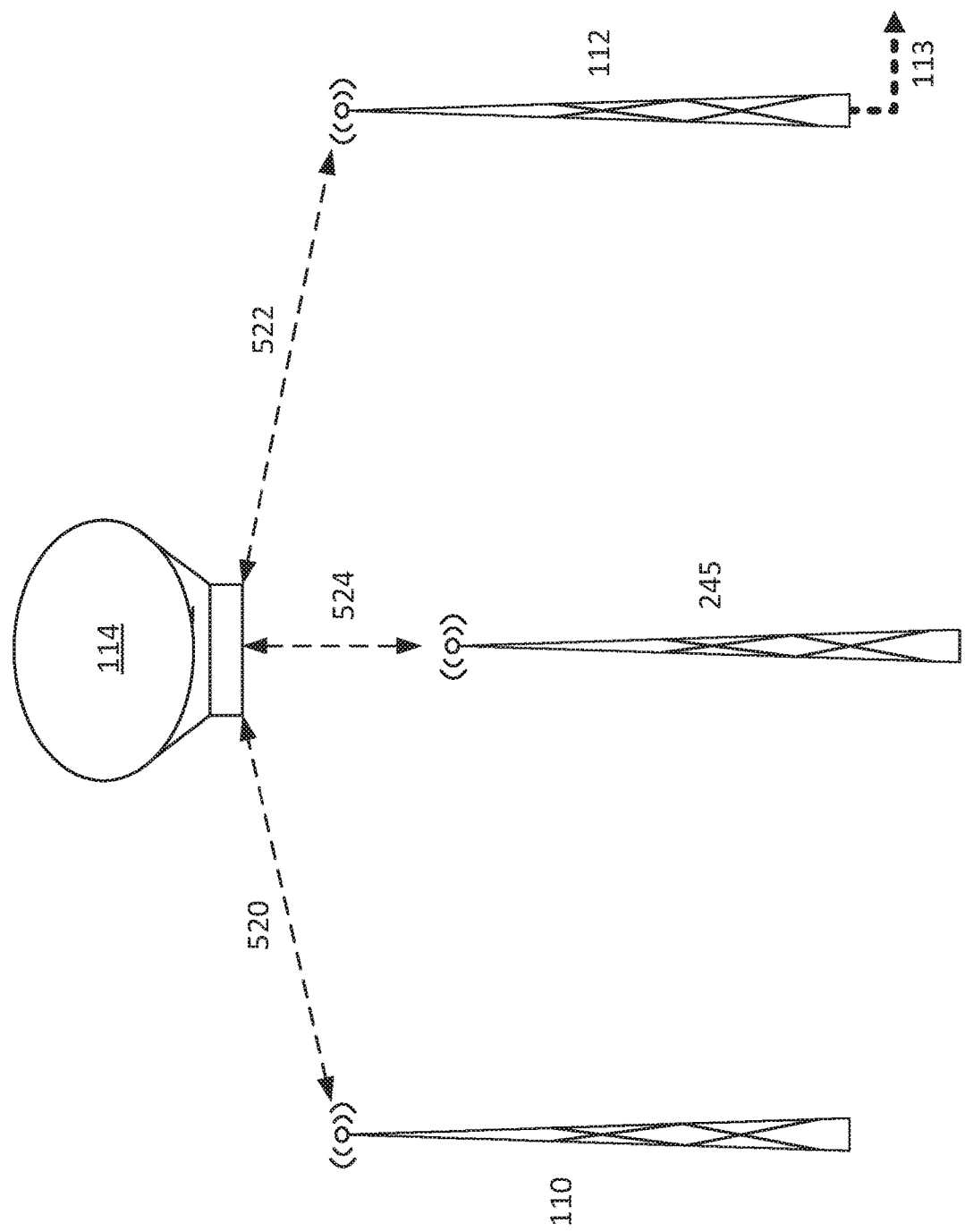
FIG. 5 is a pictorial diagram of a scenario in the network in accordance with aspects of the disclosure.

A non-terrestrial node of the network, such as a high-altitude balloon 114 or other HAP as shown in FIG. 1 and FIG. 5, may be configured to transmit a plurality of beams for forming communication links with other nodes of the network or UE, such as, to perform backhaul. In some examples, the non-terrestrial node may be configured to transmit seven beams, or more or less for access links. As a result, the non-terrestrial node of the network may have a larger coverage area than a terrestrial node of the network, and may receive a greater amount of data to backhaul than the terrestrial node. The data received for backhaul may be aggregated at the non-terrestrial node for backhaul. Given the greater amount of data to backhaul, a channel between the non-terrestrial node and a terrestrial node of the network (acting as the IAB donor node) may become overloaded, which may negatively affect the performance of the channel.

In order to support backhaul for a non-terrestrial node of the network, the non-terrestrial tower may form a plurality of links to multiple terrestrial nodes of the network simultaneously. The multiple terrestrial nodes, such as each of the three terrestrial towers 110, 112, 245 shown in FIG. 5, may each act as an IAB donor node for the non-terrestrial node, such as HAP 114. The data received at the non-terrestrial node may then be routed to a central server using one or more of the plurality of links. The routing may be performed using a module on the non-terrestrial node or using one or more processors of the central server or a network controller.

Figure 6:
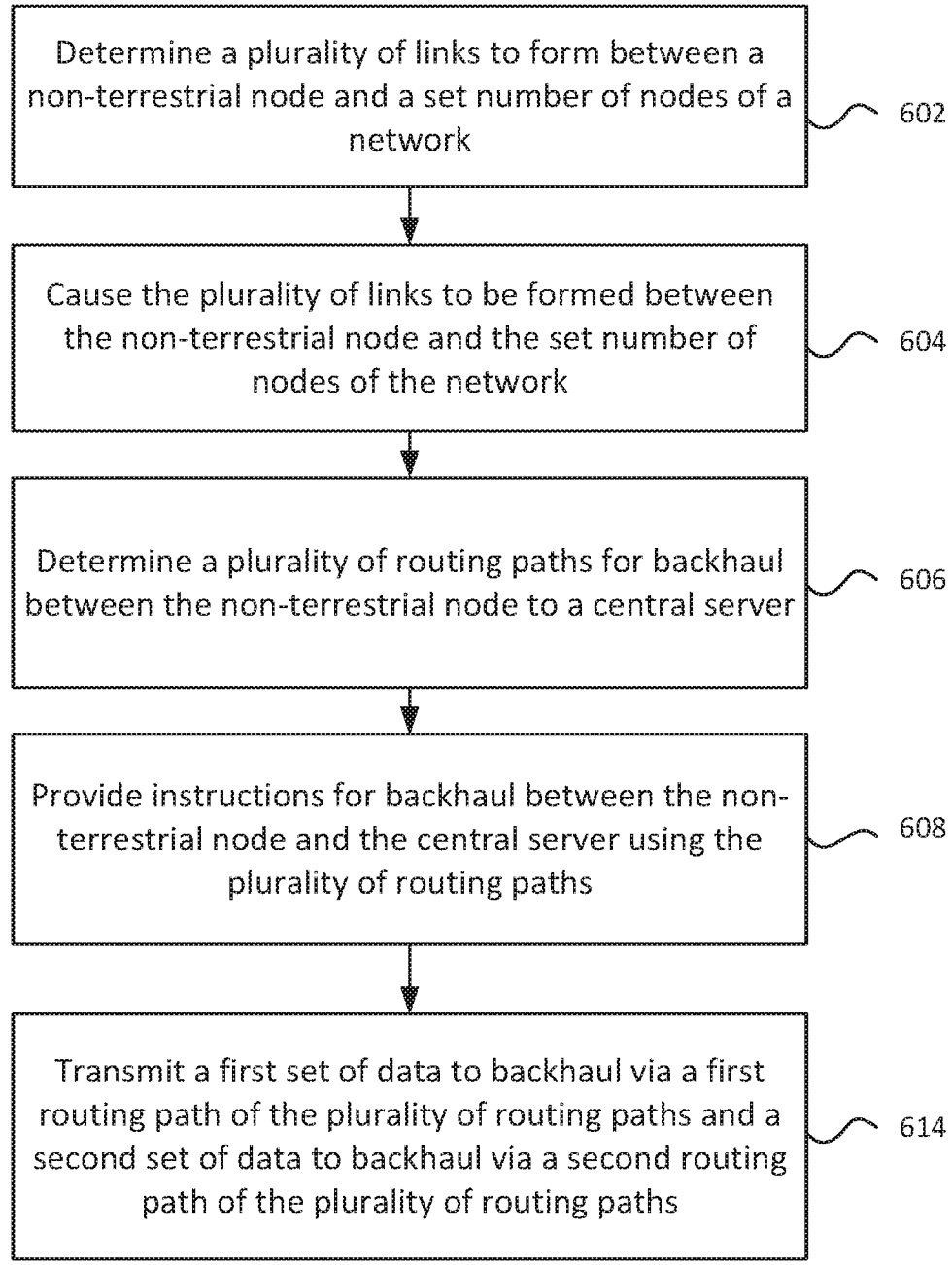
FIG. 6 is a flow diagram of a method in accordance with aspects of the disclosure.

In FIG. 6, flow diagram 600 is shown in accordance with some of the aspects described above that may be performed by one or more processors of non-terrestrial nodes of a network, such as one or more processors 310 of HAP node 114. While FIG. 6 shows blocks in a particular order, the order may be varied and that multiple operations may be performed simultaneously. Also, operations may be added or omitted.

At block 602, one or more processors may determine a plurality of links to form with a set number of nodes of the network. The plurality of links may be determined based on which nodes are in range of the non-terrestrial node, an estimated or actual amount of data received from one or more access links at the non-terrestrial node, or an estimated or actual capacity of each link between the non-terrestrial node and the node for backhaul of the data received from one or more access links at the non-terrestrial node.

For example, when HAP 114 is in range of terrestrial towers 110, 112, 245, the one or more processors 310 of HAP 114 may determine that links 520, 522, 524 should be formed. Alternatively, HAP 114 may receive an indication of an amount of data to be transmitted through a network from client devices in a geographic region, such as including client device 152. In another implementation, an estimated amount of data to be transmitted through a network via HAP 114 may be determined based on a size of a geographic region, a population density of a geographic region, or other metric. Alternatively, the amount of data may be a predetermined amount of data. A bandwidth required for transmitting the amount of data or the estimated amount of data may be greater than an actual or estimated bandwidth available in a single link 520. The one or more processors 310 may then determine that at least two links are needed to transmit the amount of data. The at least two links may include link 520 and at least one of links 522 and 524.

Additionally or alternatively, the one or more processors may determine that available bandwidth on an existing backhaul link may be running out as data is received from the one or more access links at the non-terrestrial node. An amount of data received at the non-terrestrial node or a number of client devices attempting to access the non-terrestrial node may be monitored. When the amount of data or the number of client device reaches a threshold amount less than the bandwidth of the existing backhaul link, the one or more processors may determine an additional link to be formed for backhauling.

At block 604, the one or more processors may then cause the plurality of links to be formed with the set number of nodes of the network. To form the plurality of links, the one or more processors 310 may cause the one or more transceivers 320 and/or the one or more antennas 322 of HAP 114 to transmit signals towards terrestrial towers 110, 112, 245.

At block 606, a plurality of routing paths for backhaul between the non-terrestrial node to a central server may be determined by the one or more processors. The central server may be linked to a node of the network. The plurality of routing paths may be determined based on a topology of the network that includes the plurality of links formed between the non-terrestrial node and the set of nodes of the network. A first routing path in the plurality of routing paths may include a first link of the plurality of links between the non-terrestrial node and a first node of the set of nodes, and a second routing path in the plurality of routing paths may include a second link of the plurality of links between the non-terrestrial node and a second node of the set of the nodes. For example, the one or more processors 310 may determine a first routing path to include link 520 between HAP 114 and terrestrial tower 110 and a second routing path to include link 522 between HAP 114 and terrestrial tower 112.

In some examples, determining the plurality of routing paths includes estimating a capacity of each routing path. The one or more processors 310 may determine that each of the plurality of routing paths has enough bandwidth to transmit the amount of data or the estimated amount of data to be transmitted through the network via HAP 114.

At block 608, the one or more processors may then provide instructions for backhaul between the non-terrestrial node and the central server using the plurality of routing paths. The instructions may be a routing table, and the routing table may include an indication of the estimated capacity of each routing path. The routing table may be transmitted to each node of the network included in the plurality of routing paths.

At block 610, the one or more processors may transmit a first set of data to backhaul via the first routing path and a second set of data to backhaul via the second routing path based on the routing table. The first set of data and the second set of data may be determined by the one or more processors based on an amount of data for backhaul and a capacity of the first link of the first routing path and the second link of the second routing path. Alternatively, this determination may be made based on an amount of data for backhaul and a capacity of the first routing path overall and the second routing path overall. When the amount of data is greater than the capacity of the first link or the first routing path, a remaining amount of data that exceeds the capacity of the first link or the first routing path may be transmitted via the second routing path. When the remaining amount of data exceeds the capacity of the second routing path, a third routing path may be determined, when available. Alternatively, the amount of data may be split equally between the first and second routing paths or may be based on a type of data to be backhauled. In another implementation, the one or more processors may predetermine a primary backhaul path and a secondary, tertiary, or further backup backhaul paths to be used. Alternatively, one or more processors may determine, reactively, through a routing protocol, an alternative/backup routing path to be used should the primary backhaul path, prescribed by the central server, be detected by one or more processors at the non-terrestrial nodes to be unavailable or unreliable.

In alternative implementations, one or more of the steps described above may be performed by one or more processors of the central server or the network controller, such one or more processors 410 of network controller 400, instead of the one or more processors of the non-terrestrial node. In addition, while the implementation discussed above focuses on distributed backhaul for non-terrestrial nodes, it is also possible to perform distributed backhaul for terrestrial nodes of the network as needed. Furthermore, support for access links may also be distributed in a same or similar way as described for backhaul links.

In some alternative implementations, one or more processors may determine an overall network configuration that includes a plurality of routing paths for backhaul from the non-terrestrial node. The overall network configuration may be determined to include a plurality of links to be formed and a plurality of routing paths through the plurality of links using temporospatial software-defined networking methods or big data driven networking methods. In particular, a topology including possible nodes and links may be determined for the network. The possible links in the network may not be formed yet in the network. When one or more nodes of the network are in range of the non-terrestrial node, the possible links may include one or more possible backhaul links between the non-terrestrial node and the one or more nodes.

Based on estimated or requested data transmissions through the network or other demands on the network, a plurality of routing paths through the network may be determined. The plurality of routing paths includes the plurality of routing paths for backhaul. The plurality of links to be formed for the overall network configuration may be selected based on which links are required for the plurality of routing paths. The plurality of links to be formed includes a plurality of links between the non-terrestrial node and the one or more terrestrial nodes in range of the non-terrestrial node. The one or more processors may then implement the overall network configuration by causing the nodes of the network to form the plurality of links and perform the plurality of routing paths.

Figure 7:
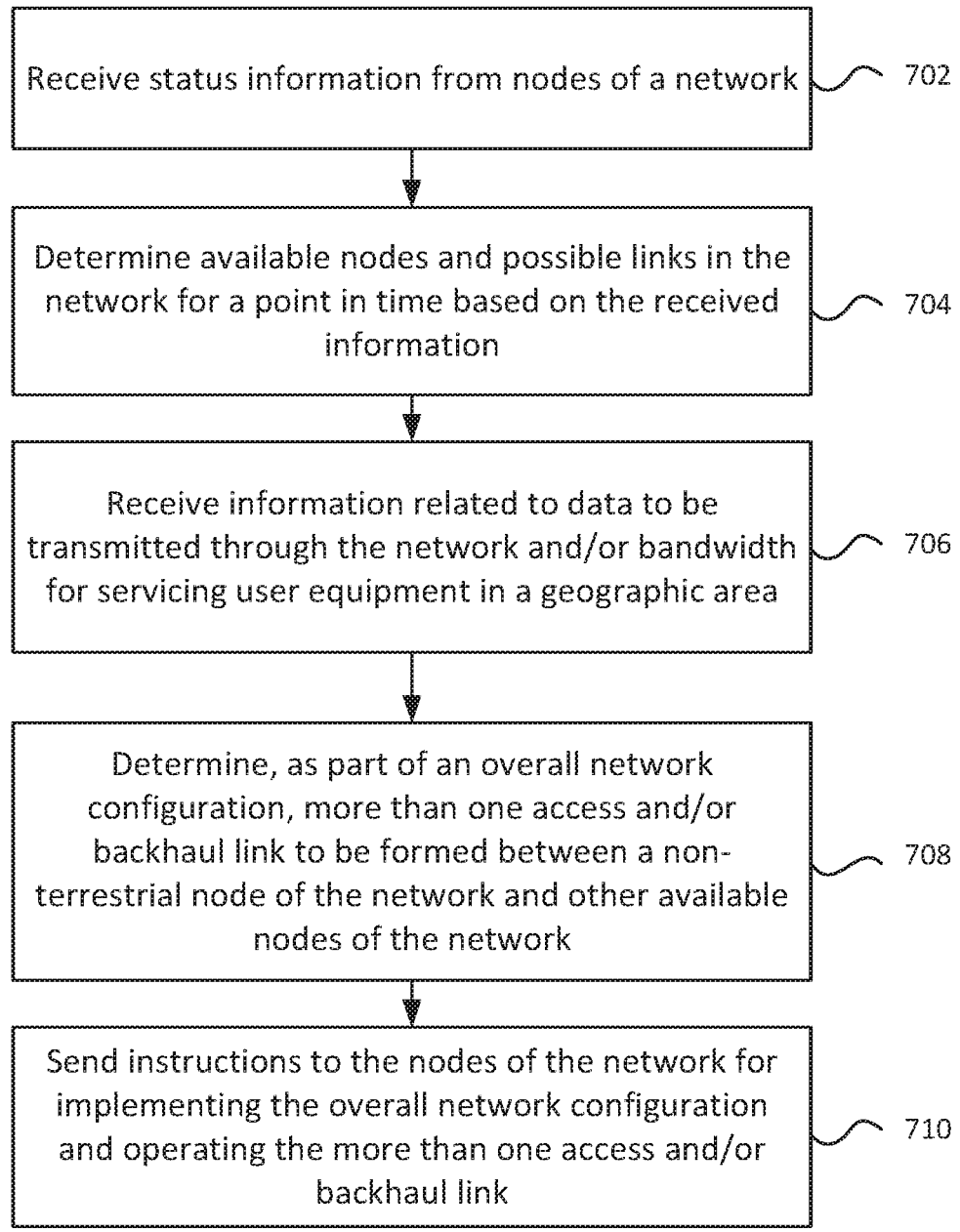
FIG. 7 is another flow diagram of a method in accordance with aspects of the disclosure.

In FIG. 7, flow diagram 700 is shown in accordance with some of the aspects described above that may be performed by one or more processors of a network controller of a network, such as one or more processors 410 of network controller 400. While FIG. 7 shows blocks in a particular order, the order may be varied and that multiple operations may be performed simultaneously. Also, operations may be added or omitted.

At block 702, the one or more processors 410 of the network controller 400 may receive status information from each of the nodes within the network. Information may be related to the current or predicted condition of the nodes, weather, or links at a current time or a future time. The current or predicted condition of the nodes may include a coverage area for a given node and bandwidth provided to the coverage area by the given node. The status information received from the nodes of the network may include the location information of HAP 114 or weather conditions at locations of terrestrial towers 110, 112, 210, 220, 230, 240, and 245 at a current time or a future time. The location information of HAP 114 may include a projected trajectory or set location, such as a future location at the future time that is in signal range of the terrestrial towers 110, 112, 245.

Figure 8:
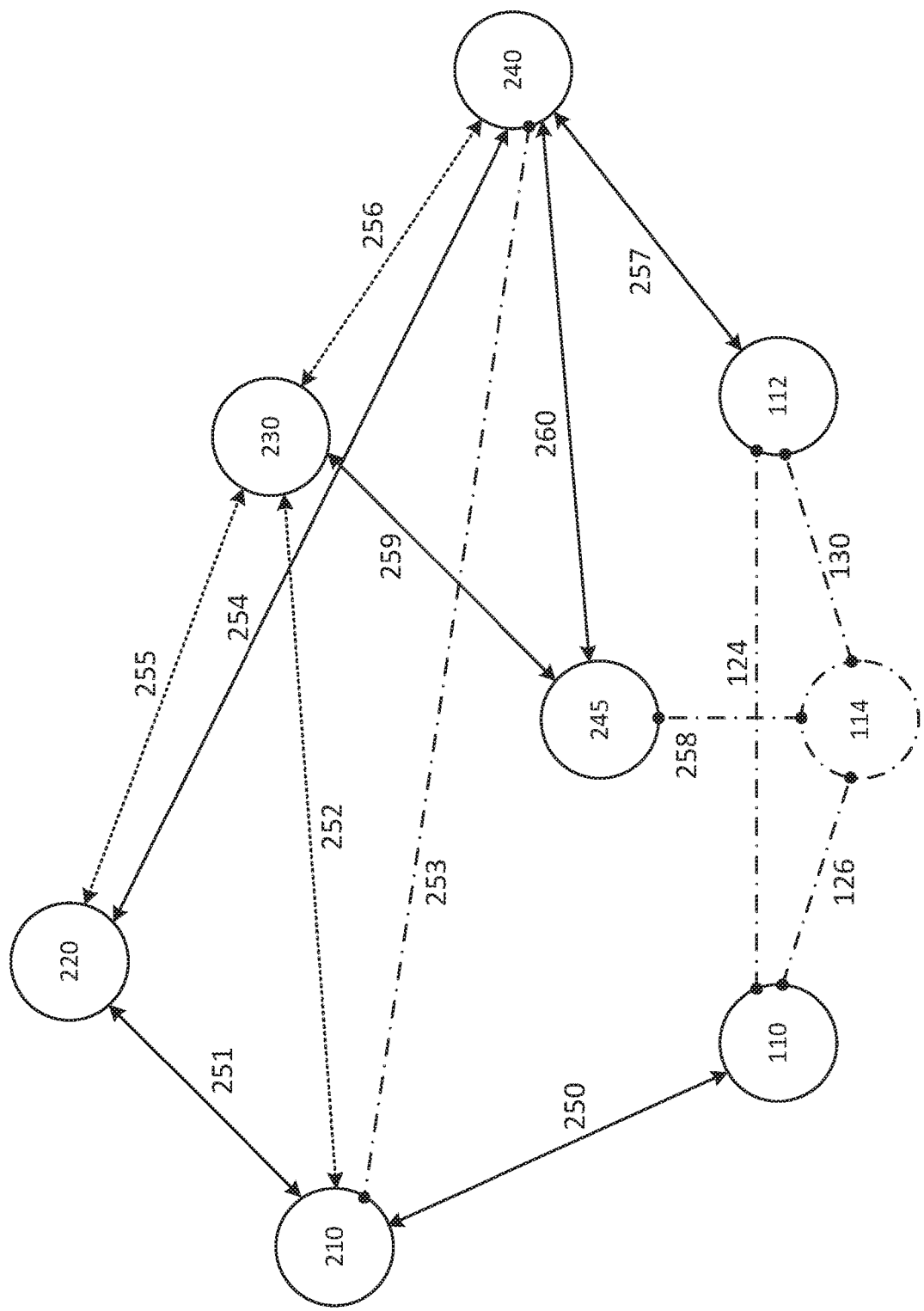
FIG. 8 is a diagram of an example network topology in accordance with aspects of the disclosure.

At block 704, the one or more processors 410 may determine available nodes and possible links in the network at a current time or a future time based on the received information. A current topology of the network may include the available nodes and possible links at the current time, and a future topology of the network may include the available nodes and possible links at the future time. As shown in FIG. 8, available nodes in the network at the current time may be determined to include terrestrial towers 110, 112, 210, 220, 230, 240, and 245. As shown by the arrows in the current topology 800, links 250-252, 254-257, and 259-260 are included in the current topology. HAP 114 may not be available in the current topology because a current location of the HAP 114 is out of signal range of the terrestrial towers 110, 112, 245. Also not available in the current topology are a first link along path 124 between terrestrial tower 110 and terrestrial tower 112, the second link along path 126 between terrestrial tower 110 and HAP 114, the third link along path 130 between HAP 114 and terrestrial tower 112, the link 253 between terrestrial towers 210 and 240, and the link 258 between HAP 114 and terrestrial tower 245 (shown as a dash-dot line without arrows in FIG. 8). The first link may be unavailable due to the building 142 blocking a signal between the terrestrial towers 110 and 112; the second link, third link, and link 258 may be unavailable due to the current location of HAP 114; and the link 253 may be unavailable due to a distance between terrestrial towers 210 and 240. Each possible link 250-252, 254-257, and 259-260 in the current topology may also be labeled with link metrics, such as bandwidth, that are determined based on the received information. In the diagram of the current topology 800, solid lines indicate that links 250, 251, 254, 257, 259, 260 are capable of higher bandwidths, such as 3 Mbps or more, and dashed lines indicate that links 252, 255, 256 are capable of lower bandwidths, such as less than 3 Mbps.

Figure 9:
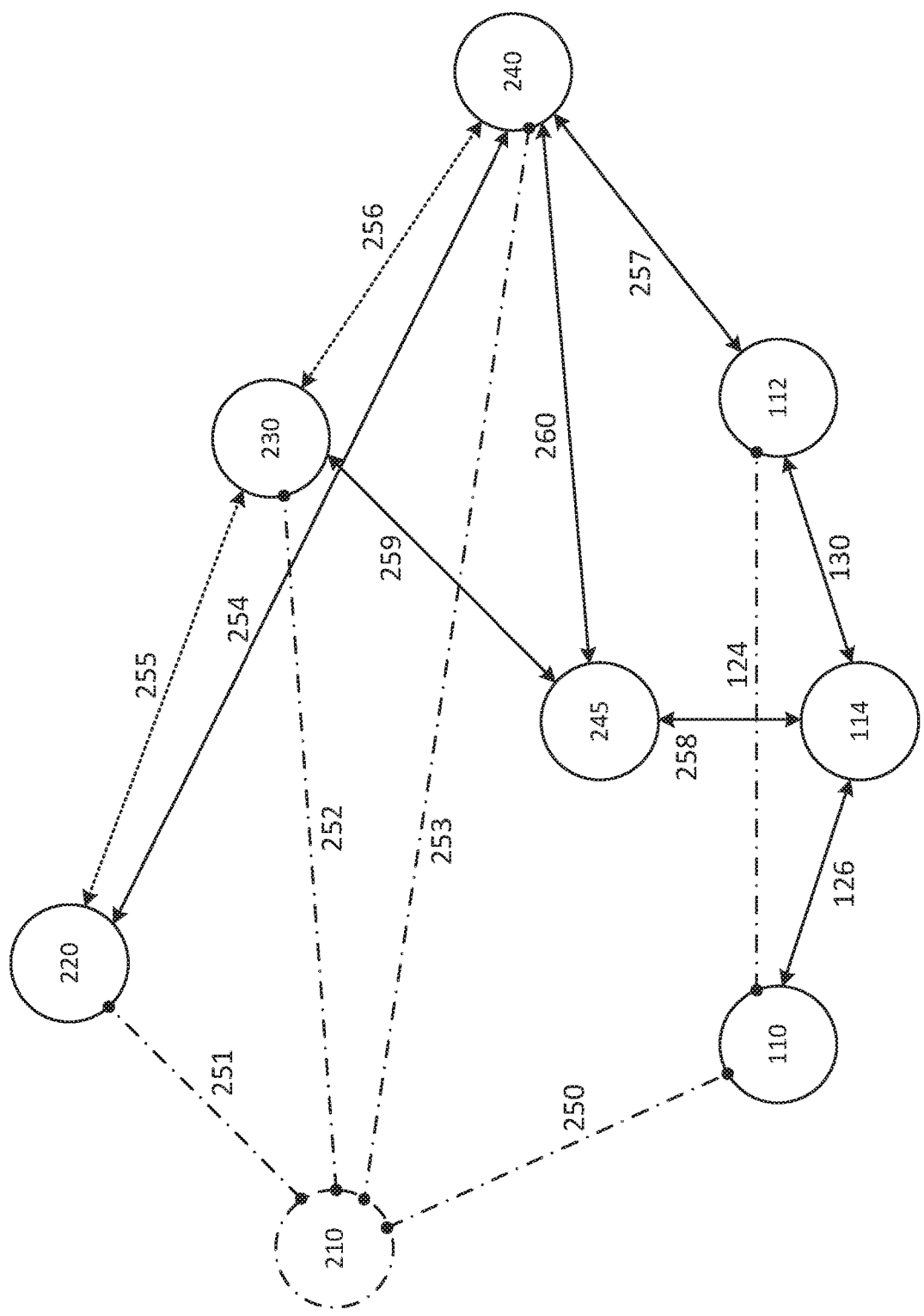
FIG. 9 is a diagram of another example network topology in accordance with aspects of the disclosure.

As shown in FIG. 9, available nodes in the network at the future time may include terrestrial towers 110, 112, 220, 230, 240, and 245, as well as the HAP 114 at the future location, which is in signal range of the terrestrial towers 110, 112. With the HAP 114 being available, possible links may be determined for the future time to include the second link along path 126 between terrestrial tower 110 and HAP 114, the third link along path 130 between HAP 114 and terrestrial tower 112, and link 258 between HAP 114 and terrestrial tower 245. Not available in the future topology 900 may be terrestrial tower 210, which may be due to weather conditions at the location of the terrestrial tower 210 including a thunderstorm at the future time. With terrestrial tower 210 being unavailable, links 250-253 between terrestrial tower 210 and other terrestrial towers 110, 220, 230, 240, respectively, may be unavailable at the future time (shown as a dash-dot line without arrows in FIG. 9).

At block 706, the one or more processors 410 may receive information related to data to be transmitted through network and/or bandwidth for servicing user equipment in given geographic areas. The data information and the bandwidth information may be received from nodes or user equipment in direct communication with the network controller 400 or may be received through existing links in the network. In some implementations, the data information and the bandwidth information may be predicted by the one or more processors 410 of the network controller 400 or by a remote system based on past data transmitted or past bandwidth usage. The data information may include an amount of data, a source location, and a destination location, or a requested time of transmission. In some cases, the data information also includes transmission requirements, such as bandwidth, class of service, quality of service, etc.

At block 708, the one or more processors 410 may determine an overall network configuration that includes more than one access and/or backhaul link to be formed between a non-terrestrial node of the network and other available nodes of the network. For example, the access link and/or the backhaul link to be formed may be between at least one terrestrial node of the network and at least one non-terrestrial node of the network when the at least one non-terrestrial node is in signal range of the at least one terrestrial node. Determining the overall network configuration may include determining one or more flows for a current or future time using the current or future topology and the data information and selecting one or more links from the possible links between available nodes to form in a network configuration based on the one or more flows. The one or more flows may include estimated bandwidth needed between nodes of the network to satisfy needs of the data information.

An access or backhaul link may be included in the selected one or more links when the one or more processors 410 determine that a non-terrestrial node can provide coverage to a geographic location that has an amount of coverage by the network that is lower than a threshold amount of coverage. The access or backhaul link may additionally be included in the selected one or more links when the one or more processors 410 determine that a non-terrestrial node can provide a link between two nodes of the network. For example, the future location of the HAP 114 may be determined to provide coverage to a geographic location between buildings 140, 142, as well as a first path between terrestrial towers 110, 112, a second path between terrestrial towers 110, 245, and a third path between terrestrial towers 112, 245. As a result, the one or more processors 410 may determine an overall network configuration for the future time that includes an access link and a backhaul link to be formed between HAP 114 and at least one of terrestrial towers 110, 112, and 245. The access link and the backhaul link may be an integrated access and backhaul link.

At block 710, the one or more processors 410 may send instructions to the nodes the network for implementing the overall network configuration and operating the access link and/or the backhaul link. The implementation instructions may be sent to the nodes at a current time or at a point in time before an implementation time. For the access link and/or the backhaul link between nodes 110, 112, 114, the implementation instructions may include instructions to establish a first link between terrestrial tower 110 and HAP 114 by controlling the one or more transceivers and/or the one or more antennas of the terrestrial tower 110 and HAP 114 to point to one another, to establish a second link between HAP 114 and terrestrial tower 112 by controlling the one or more transceivers and/or the one or more antennas of HAP 114 and the terrestrial tower 112 to point to one another, and/or to establish a third link between HAP 114 and terrestrial tower 245 by controlling the one or more transceivers and/or the one or more antennas of HAP 114 and the terrestrial tower 245 to point to one another.

Controlling the one or more transceivers and/or the one or more antennas to point in a particular direction may include electronic beamforming and/or mechanically steering directional antennas. In some examples, the implementation instructions may include instructions regarding one or more protocols for the access link and/or backhaul link, such as a user plane layer protocol and a control layer protocol, respectively. The one or more protocols may be specific to millimeter wave communications or other high frequency communications, such as 5G NR protocols.

The features disclosed herein may allow for a more seamless integration of 5G-enabled non-terrestrial nodes with existing terrestrial nodes that provide another type of coverage, such as 4G LTE. The 5G-enabled non-terrestrial nodes may then be used to supplement, expand, or strengthen the coverage of existing networks. For example, the service reliability of a network may be reinforced for M2M or IoT devices or for passengers onboard moving platforms. Multicast and broadcast resources for data may also be provided using the 5G-enabled non-terrestrial nodes, especially towards the network edges or at user terminals. In addition, non-terrestrial nodes, such as high-altitude balloons, may be used to expand network coverage into areas having little to no infrastructure for terrestrial networks. The use of non-terrestrial nodes may reduce the time and cost required to plan and install additional terrestrial nodes, especially in more remote areas.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of establishing one or more links for an integrated access and backhaul for a network, the network including a non-terrestrial node and a terrestrial node, the method comprising:

determining, by one or more processors of the non-terrestrial node, a plurality of links to form with a number of nodes in the network, wherein the determining of the plurality of links is based at least in part on weather conditions at a location of the terrestrial node at a future time, wherein the terrestrial node comprises a terrestrial tower;

causing, by the one or more processors, the plurality of links to be formed with the number of nodes in the network;

determining, by the one or more processors, a plurality of routing paths for backhaul between the non-terrestrial node to a central server;

providing, by the one or more processors, instructions for the backhaul between the non-terrestrial node and the central server using the plurality of routing paths; and transmitting, by the one or more processors, an amount of data over the plurality of routing paths, including a first set of data to backhaul via a first routing path of the plurality of routing paths and a second set of data to backhaul via a second routing path of the plurality of routing paths, an amount of data over the plurality of routing paths, wherein when the amount of data is greater than a capacity of a first routing path of the plurality of routing paths, a remaining amount of data that exceeds the capacity the first routing path is transmitted over a second routing path of the plurality of routing paths, wherein the amount of data is determined based on a received indication of an estimated amount of data for transmission through the network via the non-terrestrial node, wherein the plurality of links has a combined bandwidth greater than the estimated amount of data, wherein the estimated amount of data is determined based on a size of a geographic region, and a population density of the geographic region, wherein users are provided with network access within the geographic region.

2. The method of claim 1, wherein the determining of the plurality of links includes detecting a plurality of nodes in range of the non-terrestrial node; and
wherein the number of nodes in the network is two or more of the detected plurality of nodes.

3. The method of claim 1, wherein the determining of the plurality of links includes receiving an indication of an estimated or actual amount of data for transmission through the network via the non-terrestrial node; and
wherein the plurality of links has a combined bandwidth greater than the estimated or actual amount of data.

4. The method of claim 1, wherein the determining of the plurality of routing paths for backhaul is based on a topology of the network given a current position of the non-terrestrial node of the network.

5. The method of claim 1, wherein the determining of the plurality of routing paths for backhaul includes estimating a capacity of each routing path of the plurality of routing paths.

6. A system comprising:
one or more transceivers of a non-terrestrial node configured to establish one or more links with a terrestrial node for an integrated access and backhaul; and
one or more processors configured to:
determine a plurality of links to form with a number of nodes in a network, wherein the determined plurality of links is based at least in part on weather conditions at a location of the terrestrial node at a future time, wherein the terrestrial node comprises a terrestrial tower;
cause the one or more transceivers to form the plurality of links with the number of nodes in the network;
determine a plurality of routing paths for backhaul between the non-terrestrial node to a central server;
provide instructions for backhaul between the non-terrestrial node and the central server using the plurality of routing paths; and
transmit, using the one or more transceivers, an amount of data over the plurality of routing paths, including a first set of data to backhaul via a first routing path of the plurality of routing paths and a second set of data to backhaul via a second routing path of the plurality of routing paths, wherein when the amount of data is greater than a capacity of a first routing path of the plurality of routing paths, a remaining amount of data that exceeds the capacity the first routing path is transmitted over a second routing path of the plurality of routing paths, wherein the amount of data is determined based on a received indication of an estimated amount of data for transmission through the network via the non-terrestrial node, wherein the plurality of links has a combined bandwidth greater than the estimated amount of data, wherein the estimated amount of data is determined based on a size of a geographic region, and a population density of the geographic region, wherein users are provided with network access within the geographic region.

7. The system of claim 6, wherein the determining of the plurality of links is based on a plurality of nodes in range of the non-terrestrial node; and
wherein the number of nodes in the network is two or more of the plurality of nodes.

8. The system of claim 6, wherein the determining of the plurality of links is based on a received indication of an estimated or actual amount of data for transmission through the network via the non-terrestrial node; and
wherein the plurality of links has a combined bandwidth greater than the estimated or actual amount of data.

9. The system of claim 6, wherein the determining of the plurality of routing paths for backhaul is based on a topology of the network given a current position of the non-terrestrial node of the network.

10. The system of claim 6, wherein the determining of the plurality of routing paths for backhaul is based on an estimated capacity of each routing path of the plurality of routing paths.

11. The method of claim 1, wherein when the remaining amount of data exceeds the capacity of the second routing path, a third routing path is determined.

12. The method of claim 1, further comprising estimating the amount of data further based on past data transmitted or past bandwidth usage.

13. The method of claim 1, wherein the estimated amount of data is further based on past data transmitted or past bandwidth usage.

* * * * *